Patented Jan. 20, 1925.

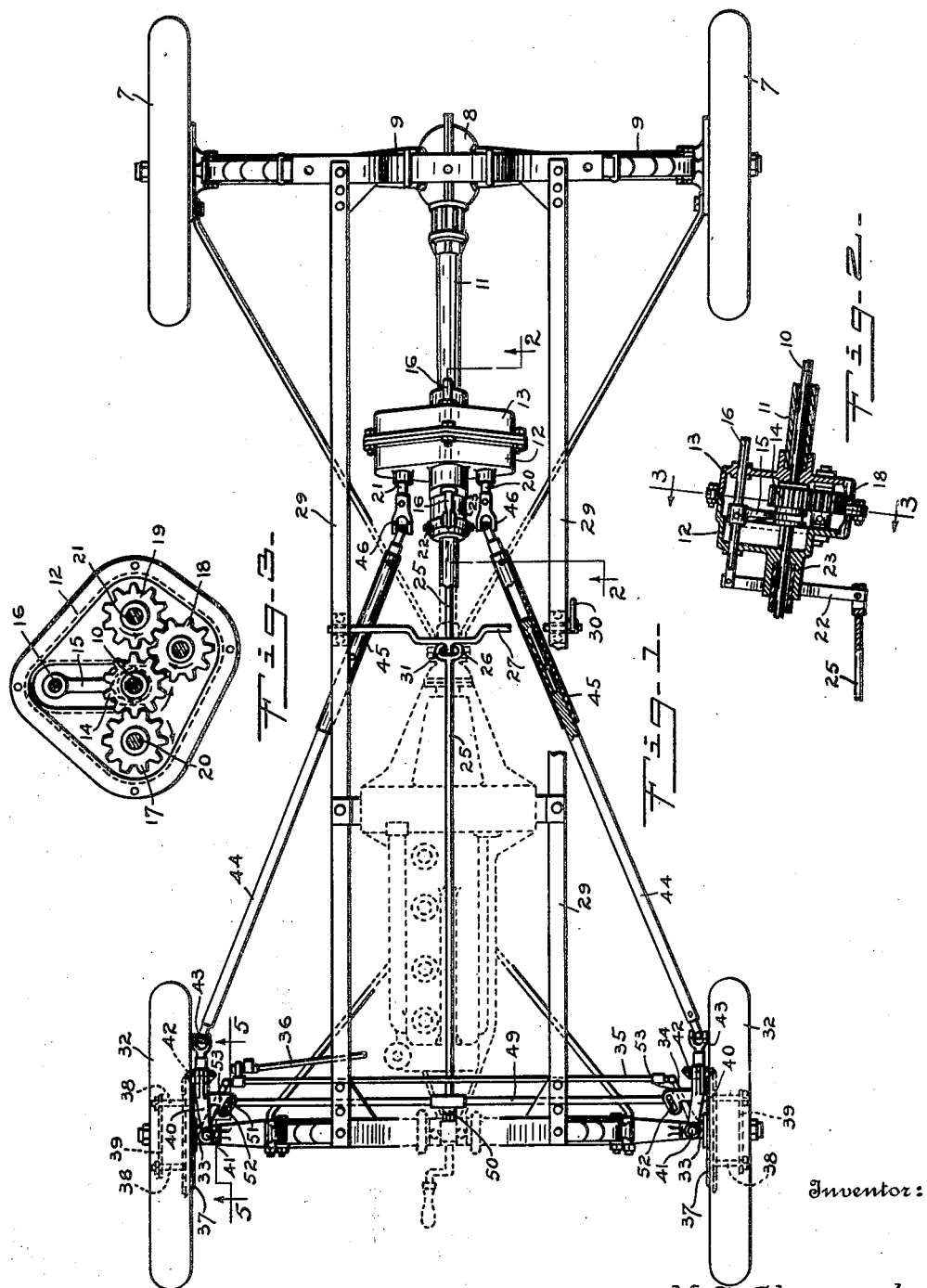

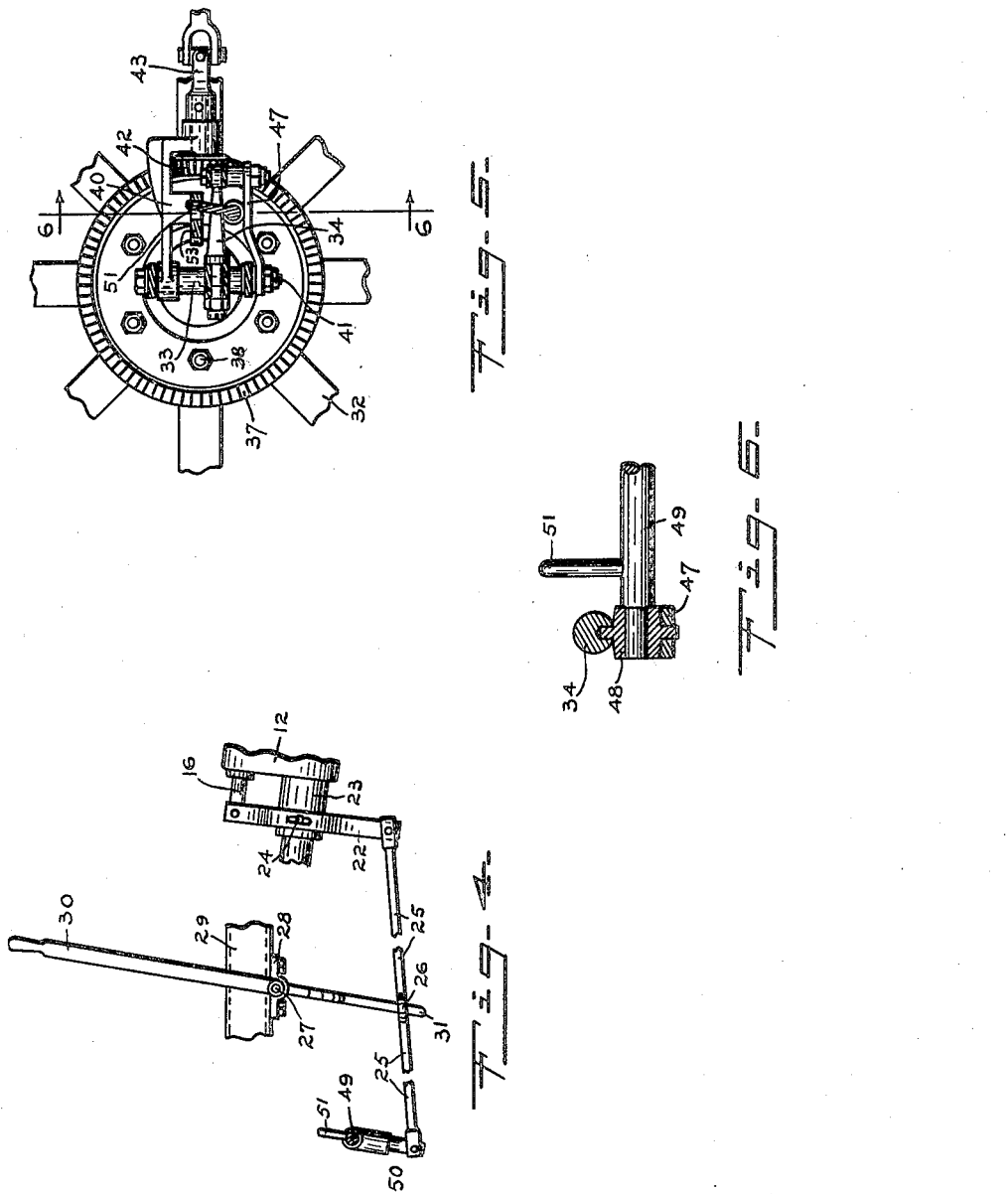

1,523,613

UNITED STATES PATENT OFFICE.

MATTHEW C. SHARPNECK, OF OMAHA, NEBRASKA, ASSIGNOR TO JOHN M. BOYD, OF COUNCIL BLUFFS, IOWA.

STEERING-WHEEL DRIVE MECHANISM FOR MOTOR VEHICLES.

Application filed September 16, 1922. Serial No. 588,691.

*To all whom it may concern:*

Be it known that I, MATTHEW C. SHARPNECK, a citizen of the United States, and a resident of Omaha, in the county of Douglas and State of Nebraska, have invented certain new and useful Improvements in Steering-Wheel Drive Mechanism for Motor Vehicles, of which the following is a specification.

My invention relates to motor vehicles, and particularly to the power transmitting means for driving the wheels. It is the object of my invention to provide simple and efficient means by which the front wheels, or steering-wheels, of a motor vehicle may be driven, either to supplement the propulsive force of the rear, or usual drive-wheels, of the vehicle, or as an independent driving means for the vehicle should the rear wheels be disabled in any way. A further object of my invention is to provide a simple throw-out or disconnecting means enabling the front-wheel drive-mechanism to be used or not, as may be desired or necessary. A further object of my invention is to provide a front-wheel drive-mechanism, having the above mentioned characteristics, and which may be readily applied or attached to vehicles now in use, without the necessity of more than minor alterations of the present structure of such vehicles. Further and more specific objects of my invention will appear hereinafter.

In the accompanying drawings Fig. 1 is a plan view of the chassis of a motor-vehicle having my invention applied thereto, a small portion of the figure being in horizontal section, Fig. 2 is a longitudinal section of the drive-gear casing, on the plane indicated by the line 2—2 of Fig. 1, Fig. 3 is a transverse section on the line 3—3 of Fig. 2, Fig. 4 is a detail side view of the throw-out lever and its associated parts, Fig. 5 is a detail section on the plane of the line 5—5 of Fig. 1, and Fig. 6 is a detail section on the plane of the line 6—6 of Fig. 5.

In the illustrated embodiment thereof my invention is applied to a vehicle of the well-known Ford type, wherein the rear wheels 7 are driven from a differential gear enclosed by the casing 8 at the center of the rear axle 9, the differential gear being driven by the propeller-shaft 10 which is inclosed by the housing-tube 11 extending between the differential-casing 8 and the transmission-gear casing at the rear end of the engine. In applying my drive-mechanism to the vehicle, the housing-tube 11 is divided into two parts, a portion at the center being removed entirely, and to the adjacent ends of the front and rear sections of the tube 11 there are fixedly connected the front and rear portions 12 and 13, respectively, of the drive-gear casing. Said casing-portions 12 and 13 are detachably secured to each other by bolts passing through the outwardly extended flanges of their adjacent edges. Upon that portion of the propeller-shaft 10 which extends through the casing 12—13 there is slidably disposed a gear 14 which is spline-connected with said shaft so as to be driven thereby. Said gear 14 has an extended hub which is grooved to receive the forked end of an arm 15, said arm being secured to a rod 16 which extends slidably through the upper portion of the casing, parallel with the shaft 10. By means of said rod and forked arm the gear 14 may be moved longitudinally of the shaft into and out of transverse alinement with the gears 17, 18 and 19. The gears 17 and 19 are carried on counter-shafts 20 and 21, respectively, which are journaled in the casing at the sides thereof, the ends of said counter-shafts extending through the front side of the casing, as shown. The gear 17 is adapted to mesh directly with the gear 14, and the gear 19 is operatively connected with the gear 14 through the intermediate gear 18 which is revolubly mounted in the lower portion of the casing and meshes with the gears 14 and 19, as shown in Fig. 3. By movement of the control-rod 16 forwardly the gear 14 is shifted along the shaft 10 to a position at which it is out of mesh with the gears 17 and 18. The movement of the control-rod 16 is effected by means of a lever 22 of which the upper end is pivotally connected with the front end of said rod, and the intermediate portion is divided to pass around the sides of the forwardly extending hub-portion 23 of the casing-member 12, to which the lever is pivotally connected by means of pins 24 extending laterally from said hub-portion through short vertical slots in the lever. To the lower end of the lever there is pivotally attached the rear end of a connecting-rod 25 which extends longitudinally beneath the engine and transmission-gear casing. At an intermediate point said rod 25 is forked to provide a transverse loop 26. Approximately in transverse alinement with said loop 26 there is arranged a shaft 27 of which the ends are mounted in bearing-blocks 28 secured upon the lower sides of the frame-sills 29, there being a hand-lever 30 secured to one end of said shaft. The intermediate part of said shaft 27 has a downwardly extended crank-like portion, from the center of which an arm 31 extends down through the loop 26 of the connecting-rod. Referring to Fig. 4 it will be seen that by movement of the hand-lever 30 the connecting-rod 25 may be moved longitudinally to actuate the shifting-lever 22 and move the control-rod 16 to place the drive-gearing in and out of mesh.

The front wheels 32 are mounted upon the usual steering-knuckles 33 having rearwardly extending steering-arms 34 connected to each other by a tie-rod 35, and actuated by means of a rod 36 connected with the steering-post in the ordinary manner. Upon the inner side of each of the front wheels 32 an annular bevel gear 37 is secured concentrically with the wheel-axis by means of bolts 38 extended through the spokes of the wheel to an annular plate 39 at the outer side thereof. On the upper portion of each steering-knuckle a bracket-arm 40 is pivotally mounted so as to be limitedly swingable in a horizontal plane about the axis of the knuckle-bolt 41. Said bracket-arms 40 extend rearwardly from the pivoted ends thereof, and at their rear ends are provided with bearings for short shafts which carry at the front ends thereof the bevel pinions 42 adapted to mesh operatively with the bevel gears 37. To the rear ends of the pinion-shafts are connected the universal joints 43, from which the shafts 44 extend diagonally rearward and inward. Said shafts 44 are connected slidably with tubular shafts 45, and the rear ends of the latter are connected by universal joints 46 to the ends of the counter-shafts 20 and 21. To each of the steering-knuckles there is connected an arm 47 beneath and substantially parallel with the steering-arm 34, being spaced therefrom as shown in Figs. 5 and 6. Between the steering-arms and said supplemental arms 47, near the rearward ends thereof, are mounted the swivel-bearings 48 in which are held the ends of the rocking-cross-shaft 49. Said shaft extends substantially parallel with the tie-rod 35 and moves parallel therewith when the steering-knuckles are turned. At the center of the cross-shaft 49 there is a downwardly extending arm 50 to which is pivotally attached the front end of the connecting-rod 25. When the tie-rod and cross-shaft 49 move laterally during the steering of the vehicle, the front end of the rod 25 is moved therewith, to one side or the other from the central position indicated in Fig. 1, and the pivotal connections of said rod with the arm 50 and with the lever 22 at the rear end, are made loose enough to permit the lateral swing of the rod. The lateral extent of the loop 26 is also such as to enable the required transverse movement of said rod 25. Near the ends of the cross-shaft 49 are upwardly extending fingers 51 which are engaged in diagonal slots 52 in plates 53 which extend inwardly from the bracket-arms 40 above the ends of the cross-shaft. Said slots 52 are so proportioned that when the fingers 51 lie in the rearward ends of the slots, as indicated in Fig. 1, the bracket-arms are thereby pressed outwardly so as to hold the pinions 42 in mesh with the gears 37. When the connecting-rod 25 is moved rearwardly the cross-shaft is turned so as to move the fingers 51 into the front portions of the slots 52, and the bracket-arms 40 are thereby pulled in toward each other, the movement of said arms about the axes of the knuckle-bolts 41 being sufficient to disengage the pinions 42 from the gears 37. The same movement of the connecting-rod which serves to disengage the pinions from the gears 37, also actuates the lever 22 and control-rod 16 to move the drive-gear 14 out of mesh with the gears 17 and 18, so that by a single movement of the hand-lever 30 the front-wheel drive-mechanism may be disconnected at both ends, and the diagonal drive-shafts 44—45 and the gears associated therewith at both ends will not be driven, either from the gear 14 or from the gears 37 should the vehicle be propelled from the rear wheels in the usual way. Conversely, movement of the hand-lever 30 to throw the rod 25 forwardly, will move the gear 14 into mesh with the gears 17 and 18, and the pinions 42 into mesh with the gears 37, whereupon power from the propeller-shaft 10 will be transmitted to the front wheels 32. The front-wheel drive-gearing is so proportioned, of course, that said wheels will be driven at the same rate as the rear wheels.

In the operation of the vehicle provided with my front-wheel drive, it is intended that under ordinary or normal conditions the vehicle will be driven from the rear wheels in the usual way. When the vehicle is so operated the only movement of the auxiliary drive mechanism which will occur, except for the mere idling movement of the gears 14 and 37, will be the sliding or telescoping movement of the diagonal drive-shaft sections 44 and 45, due to the movements of the steering-knuckles in guiding the vehicle. Should the vehicle be heavily loaded, or driven upon rough, slippery or sandy roads, or if the driving means for the rear wheels should become disabled in any way, then the front-wheel drive-gearing may be instantly thrown into operative connection with the propeller-shaft, and thus used as an auxiliary, supplementary or emergency means for propelling the vehicle.

It will be obvious that while the described mechanism might advantageously be applied to the vehicle as originally manufactured, said mechanism may be readily applied as an attachment to vehicles already in use, since the addition of my mechanism necessitates no change of the original parts of the vehicle except the cutting out of a portion of the housing-tube 11 for the insertion of the casing-parts 12 and 13, and the provision of a spline on the propeller-shaft 10 where the gear 14 is mounted thereon.

Now, having described my invention, what I claim and desire to secure by Letters Patent is:

1. The combination with a motor vehicle having a longitudinally extending propeller-shaft, and steering-wheels mounted upon knuckles which are swingable about the ends of a fixed axle; of gears secured upon said steering-wheels, pinions engageable with said gears to drive the same, supporting means for said pinions mounted upon the steering-knuckles and swingable relative thereto to move the pinions into and out of mesh with said gears, a drive-gear mounted upon the propeller-shaft, gears adapted to mesh with and be driven from said drive-gear, and flexibly and extensibly jointed shaft-members operatively connecting the latter gears with the aforesaid pinions.

2. The combination with a motor vehicle having steering wheels, driving-wheels, connecting means including a longitudinal propeller-shaft between the motor and said driving-wheels, and a tubular housing disposed about said propeller-shaft; of a casing secured to said tubular housing intermediate the ends thereof, a gear slidably mounted upon the propeller-shaft within said casing, counter-shafts journaled in said casing at each side of the propeller-shaft, gears adapted to operatively connect said counter-shafts with said slidable gear, means for moving the sliding gears into and out of mesh with said connecting gears, drive-gearing connected with the steering-wheels, and flexibly and extensibly jointed shafting connecting said counter-shafts and said drive-gearing.

3. The combination with a motor vehicle having a propeller-shaft, steering-wheels mounted upon knuckles swingable about the ends of a fixed axle, steering-arms carried by said knuckles, and means connecting said arms and controlling the swinging movements of the knuckles; of bevel-gears mounted on said wheels, bevel pinions adapted to mesh with said gears, bracket-arms mounted on the knuckles and having means for supporting said pinions, means for moving the bracket-arms to throw the pinions into and out of mesh with the gears, and flexibly and extensibly jointed connecting driving means between said pinions and the propeller-shaft of the vehicle.

4. In a structure as set forth in claim 3, means for throwing the connecting driving means into and out of connection with the propeller-shaft, said means arranged for co-action with the means for moving the bracket-arms to throw the pinions into and out of mesh with the gears on the steering-wheels.

5. A structure as set forth in claim 3, wherein the means for moving the bracket-arms comprises a rocking-shaft extending transversely between the steering-knuckles, slotted plates on the bracket-arms, fingers on the rocking-shaft extending into the slots of said plates, and means for actuating the rocking-shaft.

6. The combination with a motor vehicle having main driving wheels, steering-wheels, and a propeller-shaft connecting the motor with said main drive-wheels; of auxiliary drive mechanism comprising counter-shafts, gearing for connecting said counter-shafts and the propeller-shaft, gearing mounted upon the steering-wheels, flexibly and extensibly jointed shafting connecting the latter gearing with said counter-shafts, throw-out means for said latter gearing, throw-out means for the gearing connecting the propeller-shaft and counter-shafts, and a single controlling device for both said throw-out means.

7. Auxiliary drive mechanism for connecting the longitudinal propeller-shaft of a motor vehicle with the knuckle-mounted steering-wheels, comprising counter-shafts held in fixed axial relation to the propeller-shaft, gearing for connecting the propeller-shaft and said counter-shafts, annular gears mounted on the steering-wheels, drive-pinions for engaging said annular gears, flexibly and extensibly jointed shafting connecting said counter-shafts and drive-pinions, bracket-arms supporting said drive-pinions and movable to throw said pinions into and out of mesh with the annular gears, said bracket-arms mounted on the steering-knuckles to normally turn therewith during the steering movements thereof, slotted plates on said bracket-arms, a cross-shaft mounted upon the steering-arms and movable transversely therewith, and fingers on said cross-shaft engaging said slotted plates, said cross-shaft being movable rotatingly to control the position of the bracket-arms.

MATTHEW C. SHARPNECK.